United States Patent
Schellenberg

(10) Patent No.: US 6,351,993 B1
(45) Date of Patent: Mar. 5, 2002

(54) FLUID LEVEL SENSOR WITHOUT MOVING PARTS

(75) Inventor: Aaron Thomas Schellenberg, Ypsilanti, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/567,791

(22) Filed: May 9, 2000

(51) Int. Cl.[7] .................................................. G01F 23/00
(52) U.S. Cl. ......................................... 73/299; 73/290 R
(58) Field of Search .......................... 73/299, 300, 700, 73/714, 715, 747, 290 R, 290 B, 707, 708

(56) References Cited

U.S. PATENT DOCUMENTS

| | | | | |
|---|---|---|---|---|
| 1,646,311 A | * | 10/1927 | Page ............................ | 73/707 |
| 3,992,941 A | * | 11/1976 | McGoldrick ................. | 73/313 |
| 4,137,781 A | * | 2/1979 | Andrus ......................... | 73/707 |
| 4,665,746 A | * | 5/1987 | Sheppard ..................... | 73/302 |
| 5,105,662 A | * | 4/1992 | Marsh et al. ................. | 73/299 |
| 5,172,717 A | * | 12/1992 | Boyle et al. ................. | 137/155 |
| 5,802,910 A | * | 9/1998 | Krahn et al. ................. | 73/299 |
| 6,210,577 B1 | * | 4/2001 | Garber ......................... | 210/335 |

* cited by examiner

Primary Examiner—Hezron Williams
Assistant Examiner—Katina Wilson
(74) Attorney, Agent, or Firm—John E. Kajander

(57) ABSTRACT

An apparatus and method of for measuring fluid levels in a fluid tank (30) utilizing a no moving parts fluid level sensor (20). The apparatus comprises a hollow sensing tube (24) sealed to a pressure sensor (22). The pressure sensor (22) measures air column pressure as a function of hydrostatic pressure within the fluid tanks (30). By modifying the design of the hollow sensing tube (24) to incorporate at least 30% of the volume at its bottom end, the accuracy of the fluid level measurements may be increased by decreasing the meniscus level (34) deviation in the hollow sensing tube (24). Further, by adding a flexible diaphragm (62) to the bottom end that does not allow fluid to enter the hollow sensing tube (24), the accuracy of the fluid level measurements may be further increased by eliminating the meniscus level (34) altogether. Also, design modifications may be made to the hollow sensing tube (24) that ensures that the bottom end of the hollow sensing tube (24) is located at the bottom 30A of the fluid tank (30), or that ensures that fluid slosh effect is dampened, or ensures that the hollow sensing tube (24) is located in the center of the fluid tank (30).

17 Claims, 3 Drawing Sheets

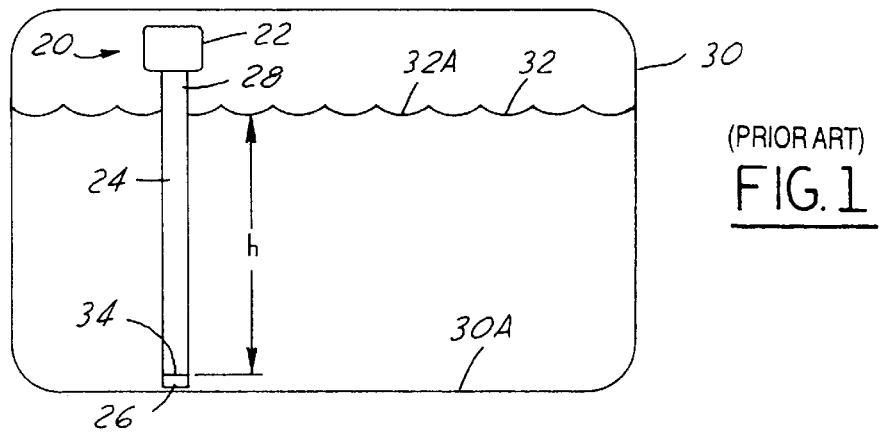
FIG. 1 (PRIOR ART)
| Factor | Worst Case Meniscus Height |
|---|---|
| Leakage in tube/Pressure sensor interface | 10.00 in |
| Temperature fluctuations (-40 °C to +60 °C) | 3.00 in |
| Compressibility of air column in sensing tube | 0.18 in |
| Tilt angle (30° tilt & 0.3 in dia tube) | 0.09 in |
FIG. 2
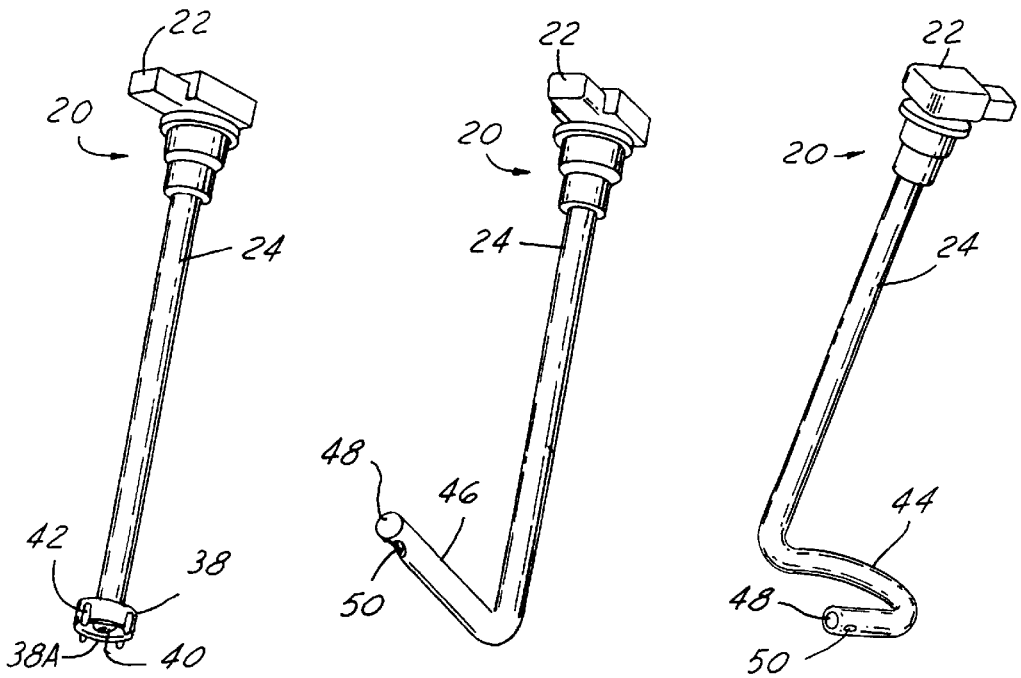
FIG. 3  FIG. 4  FIG. 5

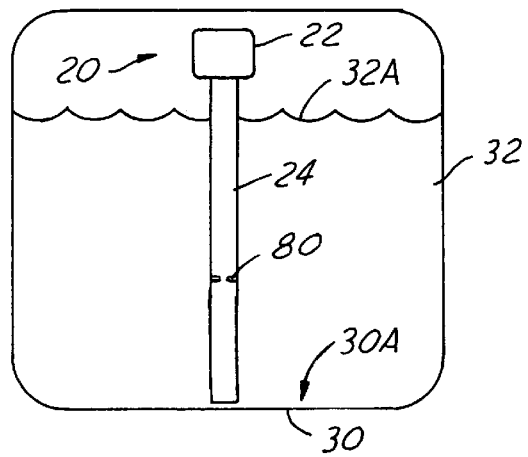
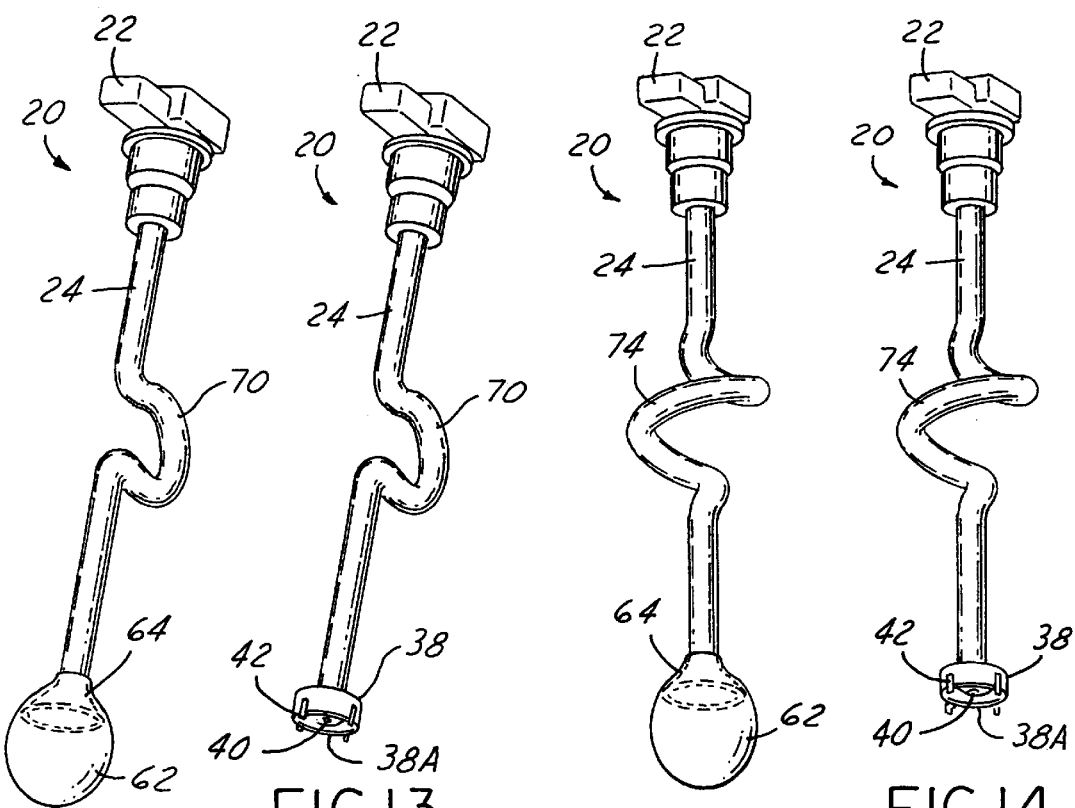

FLUID LEVEL SENSOR WITHOUT MOVING PARTS

TECHNICAL FIELD

The present invention relates to fluid systems and more particularly an apparatus and method for sensing fluid levels in fluid systems.

BACKGROUND

The majority of automobiles today employ a float arm and thick-film sender (resistance) card to measure fluid levels, and more specifically fuel levels, in a tank. The float arm follows the fluid level in the tank, which changes the resistance across a sender card. Although this method has proven satisfactory for a number of years, it has a number of movable components that are not robust for assembly. Further, the bulkiness of the float arm and thick-film sender card assemblies limits the accuracy of fluid level measurements in certain fluid tank designs because the bottoms of the assemblies do not rest near the bottom of the tank.

Recently, fluid level sensors have focused on fluid level sensors without any moving parts and which measure hydrostatic pressure to determine fluid height. In a "no moving parts sensor", a pressure sensor is connected to a tube and is open to fluid at the bottom. The air column pressure in the tube will be equal to the hydrostatic pressure caused by the fluid. The height of the fluid can be determined by the pressure reading if the density of the fluid is known. The height that is being measured is the distance between the fluid surface and the meniscus level inside the sensing tube. The meniscus level may change, however, as a function of leakage in the tube/sensor connection, temperature fluctuations, compressibility of the air column in the sensing tube, and/or the tilt angle of the tube. As the meniscus level changes, the distance between the fluid surface and the meniscus level could change.

Also, with current fluid level sensors, the bottom of the fluid tank may expand or contract as a function of fluid weight and tank pressure. As such, a fluid level sensor that is fixed in location in the fluid tank may read more or less depending upon whether the fluid tank is expanding or contracting.

Further, readings on current fluid level sensors may vary due to fluid slosh. As fluid sloshes inside a tank, the height of fluid in various portions of the tank varies. Current fluid level sensors typically average a series of readings to dampen the effect of fluid slosh.

It is thus highly desirable to keep the sensing tube free from fluid or at least lessen the effect of changing meniscus levels in the tube to increase the accuracy of fluid level readings. It is also highly desirable to have the sensing tube measuring fluid levels from the bottom of the fluid tank to increase the accuracy of the measurement of fluid levels. It is also highly desirable to lessen the effect of fluid slosh on fluid level sensor measurements.

SUMMARY OF THE INVENTION

It is an object of the present invention to reduce the effect of temperature fluctuations that vary the meniscus levels in the sensing tube. This object may be accomplished in two ways. First, the shape of the tube may be altered to concentrate the volume of the tube near the bottom. In this way, large temperature fluctuations will cause only slight variation in the meniscus level of the tube. Second, a diaphragm may be added to the end of the tube that transmits hydrostatic fluid pressure into the air column, but does not allow fluid to enter the tube. In this way, the depth of the fluid in the fluid tank is always measured from the bottom of the tube to the fluid surface, greatly increasing the accuracy of the measurement.

It is another object of the present invention to provide a "bottom-sensing" design in the tube that will force the tube to rest approximately on the bottom of the fluid tank. In this way, the measurement of fluid level will be closer to the true height of the fluid even if the fluid tank deforms due to the weight of the fluid or tank pressure/vacuum.

Other objects and advantages of the present invention will become apparent upon considering the following detailed description and appended claims, and upon reference to the accompanying drawings.

BRIEF DESCRIPTION OF THE DRAWINGS

FIG. 1 illustrates a known fluid level sensor with no moving parts showing a meniscus level;

FIG. 2 is a table detailing the worst case meniscus height based on a 10-inch fluid depth of the embodiment of FIG. 1;

FIGS. 3–12 illustrate embodiments of the present invention; and

FIGS. 13 and 14 illustrate preferred embodiments of the present invention.

DESCRIPTION OF THE PREFERRED EMBODIMENT(S)

Figure 6:
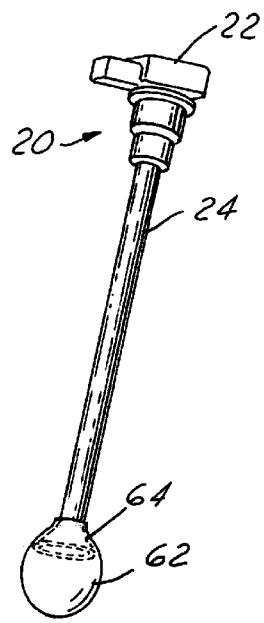

In the following figures, the same reference numerals will be used to identify identical components in the various views.

Referring now to FIG. 1, a known "no moving parts sensor" 20 is illustrated. The sensor 20 has a pressure sensor 22 (or transducer) coupled to a sensing tube 24. The sensing tube 24, which is hollow and open at the bottom 26, is sealed to the pressure sensor 22 at the top 28. The sensing tube is preferably composed of a conductive and corrosive resistant material such as plastic. The pressure sensor 22 is electrically coupled to an engine control module (not shown) which receives and interprets the signals from the pressure sensor 22 concerning fluid levels.

The sensor 20 is placed in a fluid tank 30 such that at least a portion of the sensing tube 24 is submerged in fluid 32. Preferably, the pressure sensor 22 is not submerged within the fluid 32.

At any given temperature, the air pressure within the sensing tube 24 as measured by the pressure sensor 22 will be equal to the hydrostatic pressure caused by the fluid 32. The hydrostatic pressure caused by the fluid 32 increases with depth and is based on the density of the fluid as described by the equation:

$$P_g = Ygh$$

where $P_g$ is the hydrostatic gage pressure, Y is the fluid density, g is the gravitational acceleration constant, and h is the height/depth of the fluid. Thus the pressure can determine height of the fluid if the density of the fluid is known.

As shown in FIG. 1, the height h that is being measured is not the height of the fluid 32 in the fluid tank 30, but instead is the distance between the fluid surface 32A and the meniscus level 34 (fluid level) inside the sensing tube 24. For this reason, the measurement does not reflect the true height of the fluid 32 level.

The height h of the meniscus level 34 is affected by several factors, including leakage in the tube/sensor connection, temperature fluctuations, compressibility of the air column in the sensing tube 34, and tilt angle. FIG. 2 illustrates the worst case meniscus heights on the system in FIG. 1, where the fluid height is 10 inches and a tube diameter of 0.3 inches. As the diagram indicates, some factors are more significant than others. For example, a leakage in the tube 24/pressure sensor 22 interface could cause the tube to fill completely with fluid, while a properly sealed tube having a tilt angle of 30 degrees will cause only an additional 0.09 inch meniscus displacement.

Several of these meniscus level factors can be solved quite easily. First, the leakage problem may be solved by using good manufacturing processes to assure a sealed connection. The compressibility of the air column may be eliminated by shifting the calibration down by the amount of the meniscus since this is also a function of fluid height. The tilt angle may be eliminated by better installation techniques.

Temperature fluctuation may affect the meniscus level 34 in two ways. It is well known that gases expand at high temperatures and contract at low temperatures. Thus, when a sensing tube 24 is placed into fluid 32 at a first temperature, for example room temperature, and heated to a second temperature, for example 60 degrees Celsius, the air column in the sensing tube 24 will expand and air will begin to escape out of the bottom of the tube. When the air column cools, the gas will contract and fluid 32 will enter the tube 24, causing the meniscus level 34 to rise. The Ideal Gas Law (PV=nRT) can be used to calculate how much the air column will contract during cooling. If pressure is kept constant, the amount that the air column contracts is equal to the amount of fluid 32 that gets sucked into the tube 24.

In the case of automotive fuel systems, the extremes of temperatures anticipated in a fuel tank is between −40 and 60 degrees Celsius (233 to 333 degrees Kelvin). If the fuel tank sees both extremes, it is possible that enough fuel could be sucked into the sensing tube 24 to fill about a maximum of 30% of the total volume of the tube 24. In other words, the meniscus level 34 may vary by 3 inches in a 10 inch long sensing tube 24 having a 0.3 inch diameter, causing a fuel level reading that may be inaccurate by 30%. It is important to note that the meniscus level 34 will not rise above the 30% maximum as long as the temperature fluctuations remain between −40 and 60 degrees Celsius, regardless of the fluctuations, as any subsequent temperature rises will only force fluid 32, not air, out of the sensing tube 24.

Referring now to FIGS. 3–5, three embodiments of the present invention are shown that will lessen the impact of temperature fluctuation and the accompanying meniscus level change. In each embodiment, the shape of the sensing tube 24 has been changed to concentrate at least 30% of the total volume of the tube 24 near the bottom. In this way, meniscus levels 34 will vary only slightly at extreme temperature fluctuations.

Referring to FIG. 3, one embodiment of the present invention is shown having a bulb 38 which comprises approximately 38% of the volume of the sensing tube 24. The hole 40 in the bottom 38A of the bulb 38 is small enough to minimize the effects of tilt angle, and the feet 42 on the bottom are designed to allow a small gap (not shown) between the bottom 38A and the bottom (shown as 30A on FIG. 1) of the fuel tank 30. In the worst case scenario as described above, wherein 30% of the volume of the sensing tube 24 is filled with fluid 32, the meniscus level 34 will correspondingly only rise approximately 0.4 inches, as compared with approximately 3 inches in a straight tube as shown in FIG. 1. It is contemplated that the volume in the bulb 38 of this embodiment may be increased to further lessen the rise in meniscus level 34.

Referring to FIG. 4, another embodiment of the present invention is shown having a bended portion 46 which comprises approximately 30% of the volume of the sensing tube 24. In this embodiment, the end 48 of the sensing tube 24 is plugged and a hole 50 is drilled at the bottom so that the hole 50 is as close to the bottom 30A of the fluid tank 30 so that the fluid meniscus 34 is pushed out in hot temperatures before any air bubbles are pushed out. In the worst case scenario as described above, wherein approximately 30% of the volume of the sensing tube 24 is filled with fluid 32, the meniscus level 34 will correspondingly only rise approximately 0.4 inches, as compared with approximately 3 inches in a straight tube as shown in FIG. 1. It is contemplated that the volume in the bend 46 of this embodiment may be increased to further lessen the rise in meniscus level 34.

Referring to FIG. 5, another embodiment of the present invention is shown having a unshaped bended portion 44 which comprises approximately 30% of the volume of the sensing tube 24. In this embodiment, the u-shaped bended portion 44 takes up less space in the fluid tank 30 as compared with the embodiment in FIG. 4. In this embodiment, the end 48 of the sensing tube 24 is plugged and a hole 50 is drilled at the bottom so that the hole 50 is as close to the bottom 30A of the fluid tank 30 so that the fluid meniscus 34 is pushed out in hot temperatures before any air bubbles are pushed out. In the worst case scenario as described above, wherein approximately 30% of the volume of the sensing tube 24 is filled with fluid 32, the meniscus level 34 will correspondingly only rise approximately 0.4 inches, as compared with approximately 3 inches in a straight tube as shown in FIG. 1. It is contemplated that the volume in the u-shaped bended portion 44 of this embodiment may be increased to further lessen the rise in meniscus level 34.

FIG. 6 illustrates another embodiment of the present invention. In this embodiment, a diaphragm 62 is placed on the end of a sensing tube 24. The diaphragm 62 deflects back and forth with the expanding and contracting air column without allowing fluid to enter the sensing tube 24. The diaphragm 62 is designed to accommodate the wide range of possible temperature fluctuations (−40 to 60 degrees Celsius) with sufficient expansion/contraction characteristics to resist the buildup of excess pressure/vacuum in the sensing tube. Therefore, it is critical that the diaphragm is "floppy", rather than "tight". In addition, the end 64 of the sensing tube 24 has an inverse conical shape that covers the diaphragm 62 and accommodates the 30% changes in volume of the air column while transmitting hydrostatic fluid pressure.

Figure 7:
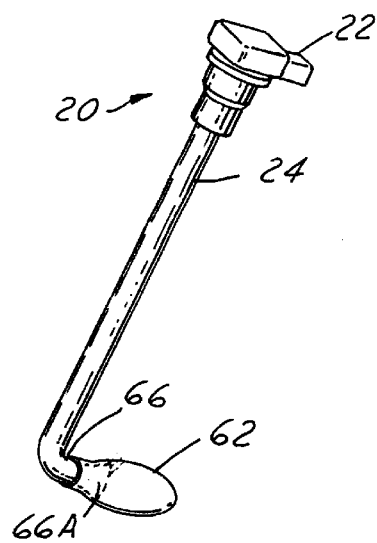

FIG. 7 illustrates another embodiment of the present invention. In this embodiment, a diaphragm 62 is placed on the end of a sensing tube 24, where the sensing tube 24 has a bended portion 66 similar to FIG. 5. The diaphragm 62 deflects back and forth with the expanding and contracting air column without allowing fluid to enter the sensing tube 24. The diaphragm 62 is designed to accommodate the wide range of possible temperature fluctuations (−40 to 60 degrees Celsius) with sufficient expansion/contraction characteristics to resist the buildup of excess pressure/vacuum in the sensing tube. Therefore, it is critical that the diaphragm is "floppy", rather than "tight". In addition, the end 66A of the sensing tube has an inverse conical shape that covers the diaphragm 62 and accommodates the 30% changes in volume of the air column while transmitting hydrostatic fluid pressure. In this embodiment, it will be necessary to trap the diaphragm 62 to keep it on the bottom 30A of the fluid tank 30.

The addition of a diaphragm 62 as shown in FIGS. 6 and 7 eliminates temperature fluctuation as a source of error in fluid level measurements in a no-moving parts fluid level sensor. Thus, since no fluid enters the tube, which in turn changes the hydrostatic pressure, fluid levels may be measured more accurately.

Figure 8:
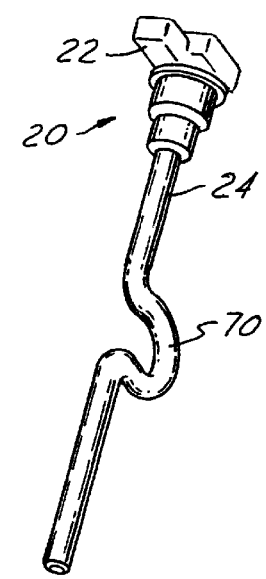
Figure 9:
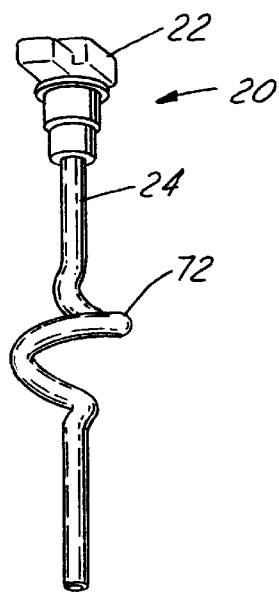
Figure 10:
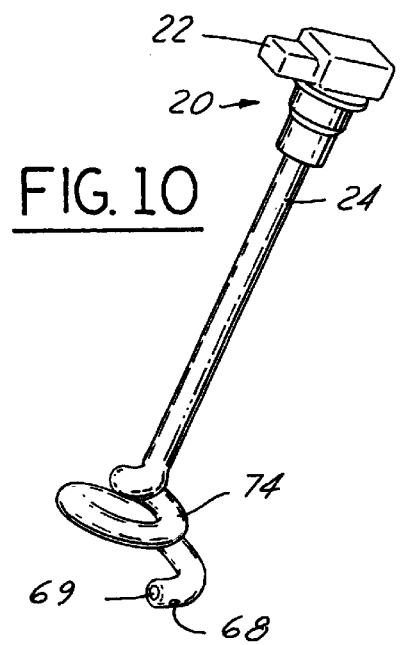

Referring now to FIGS. 8–10, three more embodiments are shown which incorporate a "bottom sensing" design in the sensing tube 24. The "bottom sensing" design assures that the bottom of the tube will always be approximately at the bottom of the tank, which is not always in a fixed location because of manufacturing tolerances and flexure in the fluid tank as it expands and contracts due to fluid weight and tank pressure.

In FIG. 8, the hollow sensing tube 24 incorporates a u-shaped bend 70 between the top 28 end that is sealed to the pressure sensor 22 and the bottom. The u-shaped bend 70 acts as a spring to ensure that the bottom of the sensing tube 24 is always at the bottom 30A of the fluid tank 30.

Referring now to FIG. 9, the hollow sensing tube 24 incorporates a spiral bend 72 between the top 28 end that is sealed to the pressure sensor 22 and the bottom. The spiral bend 72 acts as a spring to ensure that the bottom of the sensing tube 24 is always at the bottom 30A of the fluid tank 30.

In FIG. 10, a spiral bend 74 is incorporated at the bottom of the sensing tube 24 such that 30% of the volume of the hollow sensing tube is contained within the spiral bend 74. The spiral bend 74 acts as a spring to ensure that the bottom of the sensing tube 24 is always at the bottom 30A of the fluid tank 30. Further, the end 69 of the sensing tube 24 is plugged and a hole 68 is drilled at the bottom so that the hole 68 is as close to the bottom 30A of the fluid tank 30 so that the meniscus level 34 is pushed out in hot temperatures before any air bubbles are pushed out. In the worst case scenario as described above, wherein approximately 30% of the volume of the sensing tube 24 is filled with fluid 32, the meniscus level 34 (not shown in FIG. 10) will correspondingly only rise approximately 0.4 inches, as compared with approximately 3 inches in a straight tube as shown in FIG. 1. It is contemplated that the volume in the spiral bend 74 of this embodiment may be increased to further lessen the rise in meniscus level 34.

Figure 11:

Referring now to FIG. 11, another embodiment of the present invention is shown, in which the sensing tube 24 is bent such that the end 48 of the sensing tube 24 may be positioned in any location in the fluid tank 30. Ideally, the bottom 48 is located in a position in the middle of bottom portion 30A of the fluid tank 30, a location that will see the least fluid level change as a result of tilt angle or fluid slosh. Again, as above, the bending of the sensing tube 24 will act to lessen the height variation as a result of meniscus changes and low and high temperatures.

Referring now to FIG. 12, another embodiment of the present invention is shown, in which an orifice 80 is placed in the sensing tube 24. The orifice 80 functions to dampen the pressure variation in the sensing tube 24 caused by fluid slosh. The smaller the orifice 80, the greater the damping effect. More accurate readings of fluid levels will occur because variations in the meniscus level 34 caused by pressure changes due to fluid slosh will be minimized.

It is contemplated that any of the improvements listed above in FIGS. 2 through 12 may be combined to give a cumulative preferred effect. Referring now to FIGS. 13 and 14, two examples illustrating the combination of the learnings of these principles is shown.

In FIG. 13, a preferred embodiment of the present invention is shown. In this preferred embodiment, the hollow sensing tube 24 incorporates a u-shaped bend 70 between the top 28 end that is sealed to the pressure sensor 22 and a bulb 38. The bulb 38 contains at least 38% of the volume of the sensing tube 24. A hole 40 in the bottom 38A of the bulb 38 is small enough to minimize the effects of tilt angle, and the feet 42 on the bottom are designed to allow a small gap (not shown) between the bottom 38A and the bottom 30A of the fluid tank 30. In the worst case scenario as described above, wherein 30% of the volume of the sensing tube 24 is filled with fluid 32, the meniscus level 34 will correspondingly only rise approximately 0.4 inches, as compared with approximately 3 inches in a straight tube as shown in FIG. 1. It is contemplated that the volume in the bulb 38 of this embodiment may be increased to further lessen the rise in meniscus level 34. Further, the u-shaped bend 70 acts to ensure that the bulb 38 is located at the bottom 30A of the fluid tank 30 even as the fluid tanks expands and contracts due to fluid 32 weight and tank 30 pressure. This embodiment is particularly suited for applications in which the fluid tank remains stationary, such as for use in a storage tank, because vibration may cause air to escape from the sensing tube 24. Vibration acts in a similar manner to temperature fluctuation. The larger the vibration, the larger the meniscus level change due to air escaping from the sensing tube 24.

In FIG. 14, another preferred embodiment of the present invention is shown. In this preferred embodiment, the hollow sensing tube 24 incorporates a spiral bend 74 between the top 28 end that is sealed to the pressure sensor 22 a bulb 38. The bulb 38 contains at least 38% of the volume of the sensing tube 24. A hole 40 in the bottom 38A of the bulb 38 is small enough to minimize the effects of tilt angle, and the feet 42 on the bottom are designed to allow a small gap (not shown) between the bottom 38A and the bottom 30A of the fluid tank 30. In the worst case scenario as described above, wherein 30% of the volume of the sensing tube 24 is filled with fluid 32, the meniscus level 34 will correspondingly only rise approximately 0.4 inches, as compared with approximately 3 inches in a straight tube as shown in FIG. 1. It is contemplated that the volume in the bulb 38 of this embodiment may be increased to further lessen the rise in meniscus level 34. Further, the u-shaped bend 70 acts to ensure that the bulb 38 is located at the bottom 30A of the fluid tank 30 even as the fluid tanks expands and contracts due to fluid 32 weight and tank 30 pressure. This embodiment is particularly suited for applications in which the fluid tank remains stationary, such as for use in a storage tank, because vibration may cause air to escape from the sensing tube 24. Vibration acts in a similar manner to temperature fluctuation. The larger the vibration, the larger the meniscus level change due to air escaping from the sensing tube 24.

In preferred embodiments as depicted in FIGS. 13A and 14A, the bulb 38 may be replaced with a diaphragm 62. The diaphragm 62 deflects back and forth with the expanding and contracting air column without allowing fluid to enter the sensing tube 24. The diaphragm 62 is designed to accommodate the wide range of possible temperature fluctuations (−40 to 60 degrees Celsius) with sufficient expansion/contraction characteristics to resist the buildup of excess pressure/vacuum in the sensing tube. Therefore, it is critical that the diaphragm is "floppy", rather than "tight". In addition, the end 64 of the sensing tube 24 has an inverse conical shape that covers the diaphragm 62 and accommodates the 30% changes in volume of the air column while transmitting hydrostatic fluid pressure. Further, the spiral bend 74 acts to ensure that the diaphragm 62 is located at the bottom 30A of the fluid tank 30 even as the fluid tank 30 expands and contracts due to fluid 32 weight and fluid tank pressure. These embodiments are especially suited for automotive applications, or other applications in which the fluid tank 30 is not stationary, as the diaphragm 62 prevents air from escaping out of the sensing tube 24 due to vibration, an effect that is similar to temperature fluctuations.

The embodiments as described in FIGS. 13 and 14 are preferred over the prior art for many reasons. First, they eliminate assembly issues with the long float arm. Second, they eliminate corrosion and wear issues associated with a sender card. Third, they eliminate mechanical wear issues associated with the thick-film resistor cards. Fourth, each preferred embodiment facilitates easier packaging in increasingly complex fluid tank shapes because each preferred embodiment is smaller than the prior art. Finally, the no moving parts fluid level sensor provides continuous signal rather than a stepped signal according to the present technology.

Further, these embodiments incorporate the best features of each of the embodiments of FIGS. 1 through 12. First, these preferred embodiments reduce meniscus error caused by temperature fluctuations. Second, there is no serious effect of tilt angle in either embodiment. Third, each embodiment ensures that the bottom of the sensing tube 24 is kept in contact with the bottom 30A of the fluid tank 30.

While the invention has been described in terms of embodiments and preferred embodiments, it will be understood, of course, that the invention is not limited thereto since modifications may be made by those skilled in the art, particularly in light of the foregoing teachings.

What is claimed is:

1. A no moving parts fluid level sensor for use in fluid tanks, the sensor comprising:
   a pressure sensor for measuring air column pressure; and
   a hollow sensing tube having a top end and a bottom end and a first volume, wherein said top end is sealed to said pressure sensor, wherein said bottom end having an opening and a second volume;
   wherein said second volume comprises at least 30% of said first volume and wherein said hollow sensing tube has a middle section between said top end and said bottom end, said middle section having a u-shaped bend.

2. A no moving parts fluid level sensor for use in fluid tanks, the sensor comprising:
   a pressure sensor for measuring air column pressure; and
   a hollow sensing tube having a top end and a bottom end and a first volume, wherein said top end is sealed to said pressure sensor, wherein said bottom end having an opening and a second volume;
   wherein said second volume comprises at least 30% of said first volume and wherein said hollow sensing tube has a middle section between said top end and said bottom end, said middle section having a spiral bend.

3. A no moving parts fluid level sensor for use in fluid tanks, the sensor comprising:
   a pressure sensor for measuring air column pressure; and
   a hollow sensing tube having a top end and a bottom end and a first volume, wherein said top end is sealed to said pressure sensor, wherein said bottom end having an opening and a second volume;
   wherein said second volume comprises at least 30% of said first volume and wherein said hollow sensing tube has a middle section between said top end and said bottom end, said middle section having an orifice for dampening the effects of fluid slosh.

4. A no moving parts fluid level sensor for use in fluid tanks, the sensor comprising:
   a pressure sensor for measuring air column pressure; and
   a hollow sensing tube having a top end and a bottom end and a first volume, wherein said top end is sealed to said pressure sensor, wherein said bottom end having an opening and a second volume;
   wherein said second volume comprises at least 30% of said first volume and wherein said bottom end comprises a bulb portion, said bulb portion having at least one foot, said at least one foot preventing said opening from sealing to a bottom portion of the fluid tank.

5. The sensor of claim 4, wherein said hollow sensing tube has a middle section between said top end and said bottom end, said middle section having a spiral bend.

6. The sensor of claim 4, wherein said hollow sensing tube has a middle section between said top end and said bottom end, said middle section having an orifice for dampening the effects of fluid slosh.

7. A no moving parts fluid level sensor for use in fluid tanks, the sensor comprising:
   a pressure sensor for measuring air column pressure; and
   a hollow sensing tube having a top end and a bottom end and a first volume, wherein said top end is sealed to said pressure sensor, wherein said bottom end having an opening and a second volume;
   wherein said second volume comprises at least 30% of said first volume and wherein said bottom portion is bent such that said bottom portion is located adjacent to and substantially parallel to a bottom portion of the fluid tank.

8. The sensor of claim 7, wherein said bottom portion comprises a u-shaped bend.

9. The sensor of claim 7, wherein an end of said bottom portion is located in the center of said bottom portion of said fluid tank.

10. A no moving parts fluid level sensor for use in fluid tanks, the sensor comprising:
    a pressure sensor for measuring air column pressure;
    a hollow sensing tube having a top end and a bottom end, wherein said top end sealed to said pressure sensor and said bottom end having an opening; and
    a diaphragm coupled to said bottom end and covering said opening, said diaphragm being impermeable to fluid in the fluid tank and permeable to air.

11. The sensor of claim 10, wherein said hollow sensing tube has a middle section between said top end and said bottom end, said middle section having a u-shaped bend.

12. The sensor of claim 10, wherein said hollow sensing tube has a middle section between said top end and said bottom end, said middle section having a spiral bend.

13. The sensor of claim 10, wherein said bottom end is bent such that said bottom end is located adjacent to and substantially parallel to a bottom portion of the fluid tank.

14. A method for accurately measuring fluid levels in a fluid tank, the method comprising the steps of:
    sealing a top end of a hollow sensing tube to a pressure sensor that measures air pressure in said hollow sensing tube;
    placing said hollow sensing tube in the fluid tank such that a bottom end of said hollow sensing tube is immersed in and fluidically coupled to fluid in the fluid tank when said fluid is at its maximum depth and such that said pressure sensor is not immersed in fluid in the fluid tank when said fluid is at its maximum depth; and
    sealing a diaphragm around said bottom end of said hollow sensing tube such that said fluid may not enter said hollow sensing tube.

15. A method for accurately measuring fluid levels in a fluid tank, the method comprising the steps of:

sealing a top end of a hollow sensing tube to a pressure sensor that measures air pressure in said hollow sensing tube;

placing said hollow sensing tube in the fluid tank such that a bottom end of said hollow sensing tube is immersed in and fluidically coupled to fluid in the fluid tank when said fluid is at its maximum depth and such that said pressure sensor is not immersed in fluid in the fluid tank when said fluid is at its maximum depth; and modifying a middle portion of said hollow sensing tube between said top end and said bottom end to bias said bottom end of said hollow sensing tube against a bottom of said fluid tank.

16. A method for accurately measuring fluid levels in a fluid tank, the method comprising the steps of:

sealing a top end of a hollow sensing tube to a pressure sensor that measures air pressure in said hollow sensing tube;

placing said hollow sensing tube in the fluid tank such that a bottom end of said hollow sensing tube is immersed in and fluidically coupled to fluid in the fluid tank when said fluid is at its maximum depth and such that said pressure sensor is not immersed in fluid in the fluid tank when said fluid is at its maximum depth; and introducing an orifice in said hollow sensing tube that functions to dampen the effect of fluid slosh in the fluid tank.

17. A method for accurately measuring fluid levels in a fluid tank, the method comprising the steps of:

sealing a top end of a hollow sensing tube to a pressure sensor that measures air pressure in said hollow sensing tube;

placing said hollow sensing tube in the fluid tank such that a bottom end of said hollow sensing tube is immersed in and fluidically coupled to fluid in the fluid tank when said fluid is at its maximum depth and such that said pressure sensor is not immersed in fluid in the fluid tank when said fluid is at its maximum depth, wherein said bottom end of said hollow sensing tube comprises at least approximately 30% of the volume of said hollow sensing tube; and sealing a diaphragm around said bottom end of said hollow sensing tube such that said fluid may not enter said hollow sensing tube.

\* \* \* \* \*